(12) United States Patent
Usa

(10) Patent No.: US 10,747,381 B2
(45) Date of Patent: Aug. 18, 2020

(54) FILM AND INPUT DEVICE

(71) Applicant: FUJITSU COMPONENT LIMITED, Tokyo (JP)

(72) Inventor: Hiroki Usa, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/128,683

(22) Filed: Sep. 12, 2018

(65) Prior Publication Data

US 2019/0146607 A1    May 16, 2019

(30) Foreign Application Priority Data

Nov. 15, 2017   (JP) ................................ 2017-220348

(51) Int. Cl.
| | |
|---|---|
| G06F 3/044 | (2006.01) |
| G02B 27/10 | (2006.01) |
| G02F 1/1333 | (2006.01) |
| G06F 3/039 | (2013.01) |
| G06F 1/16 | (2006.01) |
| G02B 30/56 | (2020.01) |

(52) U.S. Cl.
CPC ......... *G06F 3/044* (2013.01); *G02B 27/1086* (2013.01); *G02B 30/56* (2020.01); *G02F 1/13338* (2013.01); *G06F 1/1632* (2013.01); *G06F 3/0393* (2019.05)

(58) Field of Classification Search
CPC . G06F 3/044; G02B 27/1086; G02B 27/2292; G02F 1/13338
See application file for complete search history.

(56) References Cited

U.S. PATENT DOCUMENTS

| | | | |
|---|---|---|---|
| 6,456,279 B1 | 9/2002 | Kubo et al. | |
| 9,811,184 B2 | 11/2017 | Buckley | |
| 2007/0266447 A1* | 11/2007 | Hollander | G06F 21/32 726/34 |
| 2012/0120019 A1 | 5/2012 | Choi et al. | |
| 2015/0319280 A1* | 11/2015 | Gardenfors | H04M 1/72519 455/566 |

FOREIGN PATENT DOCUMENTS

| | | |
|---|---|---|
| KR | 10-2012-0066719 | 6/2012 |
| KR | 10-2016-0107690 | 9/2016 |
| WO | 2010/150724 A1 | 12/2010 |

OTHER PUBLICATIONS

Partial European Search Report dated Mar. 8, 2019 in corresponding European Patent Application No. 18194373.9.
Espacenet English Abstract for Korean Patent Publication No. 2012-0066719, published Jun. 25, 2012.
Espacenet English Abstract for Korean Patent Publication No. 2016-0107690, published Sep. 19, 2019.
Korean Patent Office Action dated Sep. 30, 2019 in corresponding application No. 10-2018-0118758.

* cited by examiner

*Primary Examiner* — Priyank J Shah
(74) *Attorney, Agent, or Firm* — Staas & Halsey LLP

(57) ABSTRACT

A film includes: a first electrode facing a desired position in a screen of a display device, a capacitive touch panel being included in or externally attached to the display device; a second electrode electrically connected to the first electrode; and an optical layer that refracts light from the screen of the display device in a desired direction.

5 Claims, 6 Drawing Sheets

FILM AND INPUT DEVICE

CROSS-REFERENCE TO RELATED APPLICATION

This application is based upon and claims the benefit of priority of the prior Japanese Patent Application No. 2017-220348 filed on Nov. 15, 2017, the entire contents of which are incorporated herein by reference.

FIELD

A certain aspect of the embodiments is related to a film and an input device.

BACKGROUND

There have been conventionally known input devices, such as a touch panel provided on a liquid crystal display panel (see International Publication No. 2010/150724, for example). Other examples of such known input devices include "in-cell" liquid crystal displays that have touch panel functions in TFT (Thin-Film-Transistor) liquid crystal cells, and "on-cell" liquid crystal displays that have touch panel functions on the glass substrate of a liquid crystal display.

SUMMARY

According to an aspect of the present disclosure, there is provided a film including: a first electrode facing a desired position in a screen of a display device, a capacitive touch panel being included in or externally attached to the display device; a second electrode electrically connected to the first electrode; and an optical layer that refracts light from the screen of the display device in a desired direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a case where a liquid crystal display with a built-in touch panel, such as an "in-cell" liquid crystal display or an "on-cell" liquid crystal display is incorporated into a point-of-sale (POS) terminal, a medical device, or the like, it is often the case that only a certain operational region on the liquid crystal display with a built-in touch panel is used. Therefore, the unused region on the liquid crystal display with a built-in touch panel have excess functions that might trigger incorrect touch detection. For example, if droplets of moisture adhere to the unused region or a conductor such as a metal is placed in the vicinity of the unused region, incorrect contact detection might be performed.

The following is a description of an embodiment of the present invention, with reference to the drawings.

Figure 1:
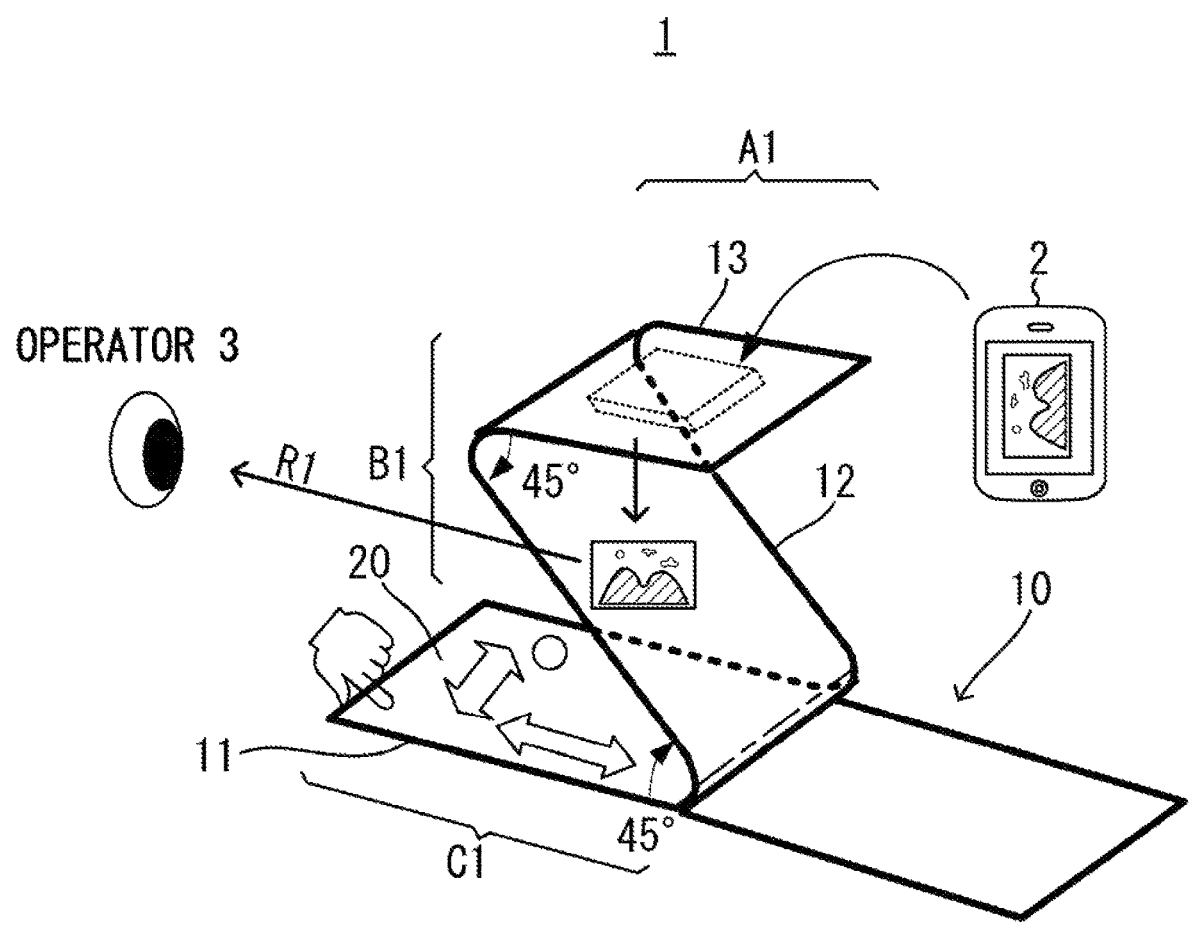
FIG. 1 is a configuration diagram of an input device according to this embodiment.
Figure 2:
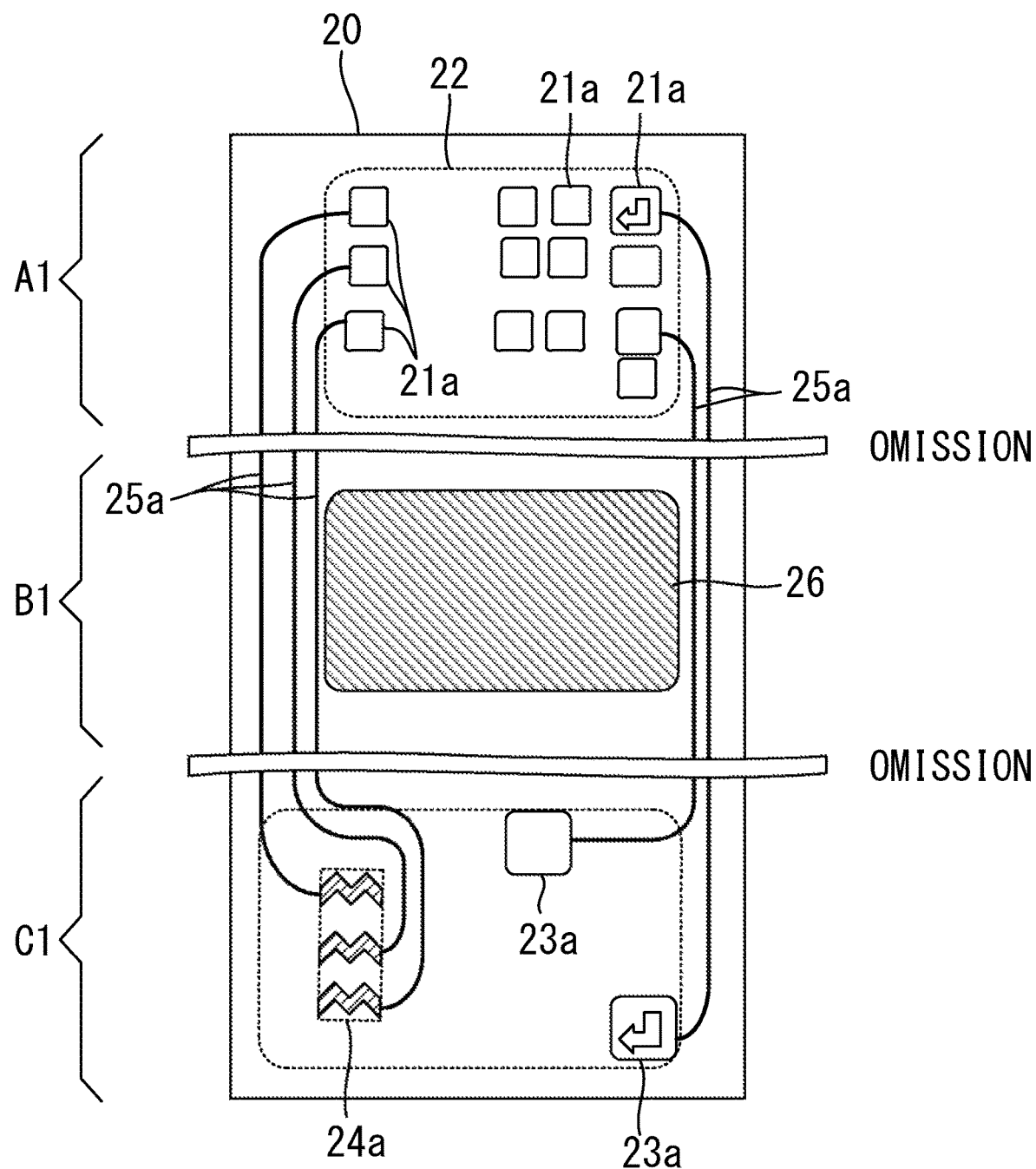
FIG. 2 is a configuration diagram of a film according to this embodiment.

FIG. 1 is a configuration diagram of an input device according to this embodiment. FIG. 2 is a configuration diagram of a film according to this embodiment.

In FIG. 1, an input device 1 according to this embodiment includes a support stand 10, and a film 20 bonded to a surface of the support stand. The support stand 10 is formed with an insulating material such as transparent glass, polyethylene terephthalate (PET), or acrylic. The support stand 10 includes a bottom portion 11, a middle portion 12 that has its one end secured almost to the center of the bottom portion 11 and stands obliquely upward almost from the center of the bottom portion 11, and a ceiling portion 13 that extends horizontally from the other end of the middle portion 12 and is substantially parallel to the bottom portion 11.

The angle between the middle portion 12 and the bottom portion 11 is 45 degrees, and the angle between the ceiling portion 13 and the middle portion 12 is also 45 degrees. However, the angle between the middle portion 12 and the bottom portion 11, and the angle between the ceiling portion 13 and the middle portion 12 are not necessarily 45 degrees, which is merely an example.

In this embodiment, the bottom portion 11, the middle portion 12, and the ceiling portion 13 are integrally formed. The bottom portion 11, the middle portion 12, and the ceiling portion 13 may be formed as separate components, and be assembled into the shape shown in FIG. 1. Although the middle portion 12 and the ceiling portion 13 are transparent, the bottom portion 11 is not necessarily transparent. The bottom portion 1 may be a molded interconnect device (MID) that is a molded component having a circuit (electrodes) formed with a metal film on the surface, or a printed circuit board (PCB) or the like.

It should be noted that, in FIG. 1, the surface of the bottom portion 11 on the side of an operator 3 is set as a region C1, the surface of the middle portion 12 on the side of the operator 3 is set as a region B1, and the upper surface of the ceiling portion 13 is set as a region A1. The film 20 is bonded onto the surface of the bottom portion 11 on the side of the operator 3 (the region C1), the surface of the middle portion 12 on the side of the operator 3 (the region B1), and the upper surface of the ceiling portion 13 (the region A1).

An information processing terminal 2 is a device with a liquid crystal display that includes a capacitive touch panel. The information processing terminal 2 is a smartphone, a tablet terminal, or the like.

In FIG. 2, the portions of the film 20 corresponding to the regions A1 through C1 are formed with a single continuous film.

The portion of the film 20 corresponding to the region A1 includes transparent electrodes 21a serving as the first electrode. When the information processing terminal 2 with the liquid crystal display including the capacitive touch panel facing downward is placed on the ceiling portion 13 as shown in FIG. 1, the transparent electrodes 21a are brought into contact with the liquid crystal display of the information processing terminal 2, or face the liquid crystal display via a narrow space (narrower than 2 mm, for example). The number of the transparent electrodes 21a is not necessarily the same as that shown in the example in FIG. 2. Further, the transparent electrodes 21a are insulated from one another. A dotted line 22 indicates the position at which the liquid crystal display of the information processing terminal 2 is to be placed.

The portion of the film 20 corresponding to the region B includes a light diffraction layer 26 serving as the optical layer. The light diffraction layer 26 is formed with a combiner film, for example, and semi-reflects the image on the liquid crystal display of the information processing terminal 2. Semi-reflection means that the reflectance in the visible light band is lower than 100% and higher than 0%. For example, part of the liquid crystal display light from the ceiling portion 13 is reflected (refracted) by the light diffraction layer 26, and is guided toward the operator 3 (or in a direction R1 perpendicular to the light incident direction) in FIG. 1. In other words, when the information processing terminal 2 is placed on the ceiling portion 13, with the liquid crystal display including the capacitive touch panel facing downward, the image displayed on the liquid crystal display is semi-reflected (refracted) by the light diffraction layer 26, so that the operator 3 can check the image displayed on the liquid crystal display as a floating image.

The portion of the film 20 corresponding to the region C1 includes transparent electrodes 23a and a slider electrode 24a that serve as the second electrode. The number of transparent electrodes 23a and the number of slider electrodes 24a are not necessarily the same as those shown in the example in FIG. 2. The transparent electrodes 23a are connected to transparent electrodes 21a in the region A via wiring lines 25a. The slider electrode 24a is a transparent electrode for inputting continuous operations conducted by the operator 3 with a finger, and is connected to transparent electrodes 21a in the region A1 via wiring lines 25a. The wiring lines 25a are wiring lines made of a conductive material. For example, the wiring lines 25a are copper wiring lines formed by printing, and are several μm in width.

The light diffraction layer 26 is disposed between the transparent electrodes 21a, and the transparent electrodes 23a and the slider electrode 24a. The transparent electrodes 21a, and the transparent electrodes 23a and the slider electrode 24a are formed with a low-resistance material such as metal (copper) mesh, carbon nanotube, or graphene, and are capable of light transmission, having a mesh form.

The transparent electrodes 23a and the slider electrode 24a are connected to the transparent electrodes 21a in the region A1 via the wiring lines 25a. When the information processing terminal 2 with the liquid crystal display including the capacitive touch panel facing downward is placed on the ceiling portion 13 as shown in FIG. 1, the operator 3 can operate the transparent electrodes 23a and the slider electrode 24a, to operate only the function displayed on the liquid crystal display at the position facing the corresponding transparent electrode 21a.

As shown in FIG. 2, the transparent electrodes 23a and the slider electrode 24a can be disposed at any positions in the region C1, regardless of the positions of the transparent electrodes 21a in the region A1. As the transparent electrodes 21a are disposed at the positions at which the necessary functions among the functions displayed on the liquid crystal display of the information processing terminal 2 are displayed, it is possible to rearrange the electrodes corresponding only to the necessary functions among the functions displayed on the liquid crystal display of the information processing terminal 2. In other words, in the region C1, the electrodes corresponding only to the frequently used functions can be rearranged.

Note that the light diffraction layer 26 is not necessarily disposed between the transparent electrodes 21a, and the transparent electrodes 23a and the slider electrode 24a. For example, instead of the light diffraction layer 26 in the region B1 of the film 20, the light diffraction layer 26 may be disposed above the region A1 of the film 20 in FIG. 2, i.e., at the top edge side of the film 20, so that the light diffraction layer 26 is located on the middle portion 12 on the opposite side from the operator 3 in FIG. 1.

Figure 3A:
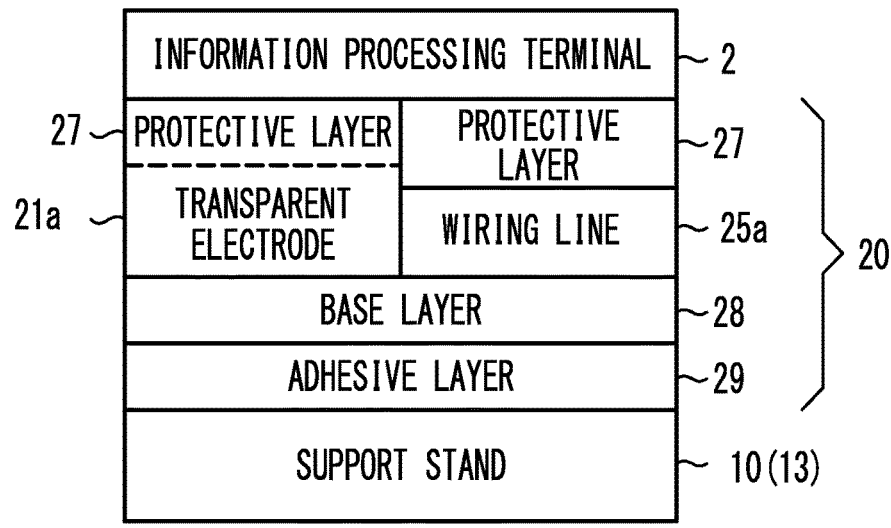
FIG. 3A is a cross-sectional view of a region A1 in a case where an information processing terminal is placed thereon.
Figure 3B:
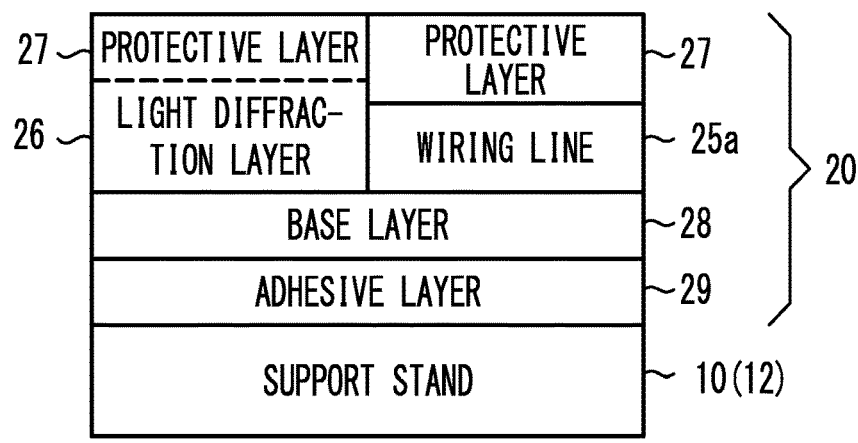
FIG. 3B is a cross-sectional view of a region B1.
Figure 3C:
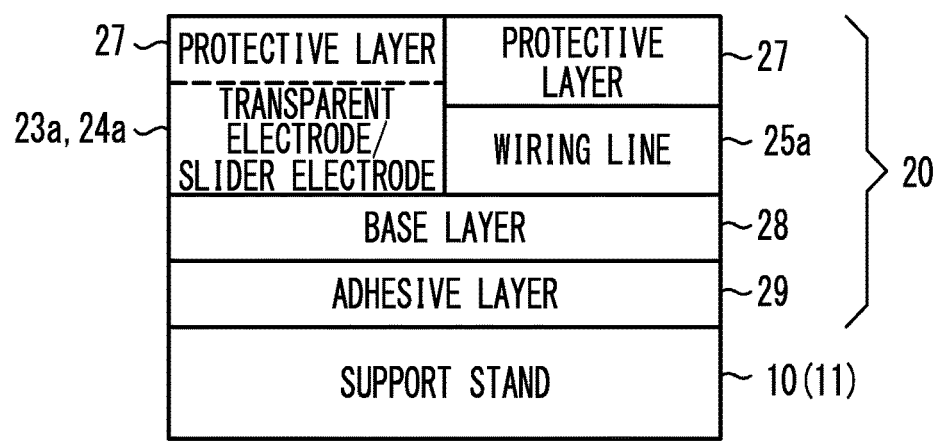
FIG. 3C is a cross-sectional view of a region C1.

FIG. 3A is a cross-sectional view of the region A1 in a case where the information processing terminal 2 is placed thereon. FIG. 3B is a cross-sectional view of the region B1. FIG. 3C is a cross-sectional view of the region C1.

As shown in FIG. 3A, in a case where the information processing terminal 2 is placed on the ceiling portion 13, the film 20 is located between the information processing terminal 2 and the ceiling portion 13. In the region A1, the film 20 includes the transparent electrodes 21a, the wiring lines 25a, a protective layer 27, a base layer 28, and an adhesive layer 29. The adhesive layer 29, the base layer 28, the transparent electrodes 21a or the wiring lines 25a, and the protective layer 27 are stacked in this order on the support stand 10.

The adhesive layer 29 is a transparent adhesive such as an optically clear adhesive (OCA) or an optically clear resin (OCR). The base layer 28 is a transparent film such as a PET film. The protective layer 27 is a transparent resin or the like for protecting the transparent electrodes 21a and the wiring lines 25a. The protective layer 27 may be provided on the transparent electrodes 21a, but is not necessarily provided thereon.

In the region B1, the film 20 includes the light diffraction layer 26, the wiring lines 25a, the protective layer 27, the base layer 28, and the adhesive layer 29. The adhesive layer 29, the base layer 28, the light diffraction layer 26 or the wiring lines 25a, and the protective layer 27 are stacked in this order on the support stand 10. The protective layer 27 may be provided on the light diffraction layer 26, but is not necessarily provided thereon.

In the region C1, the film 20 includes the transparent electrodes 23a, the slider electrode 24a, the wiring lines 25a, the protective layer 27, the base layer 28, and the adhesive layer 29. The adhesive layer 29, the base layer 28, the transparent electrodes 23a/the slider electrode 24a or the wiring lines 25a, and the protective layer 27 are stacked in this order on the support stand 10. The protective layer 27 may be provided on the transparent electrodes 23a and the slider electrode 24a, but is not necessarily provided thereon.

Figure 4:
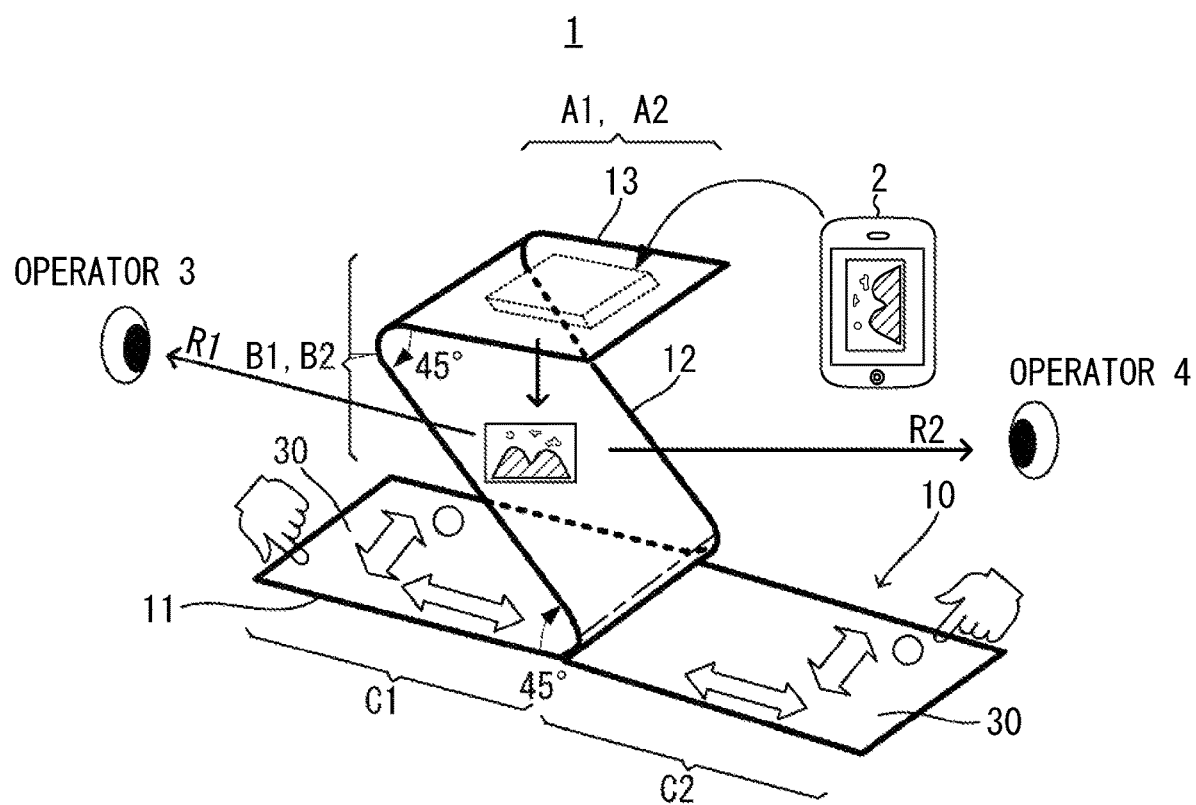
FIG. 4 is a configuration diagram of a modification of the input device.
Figure 5:
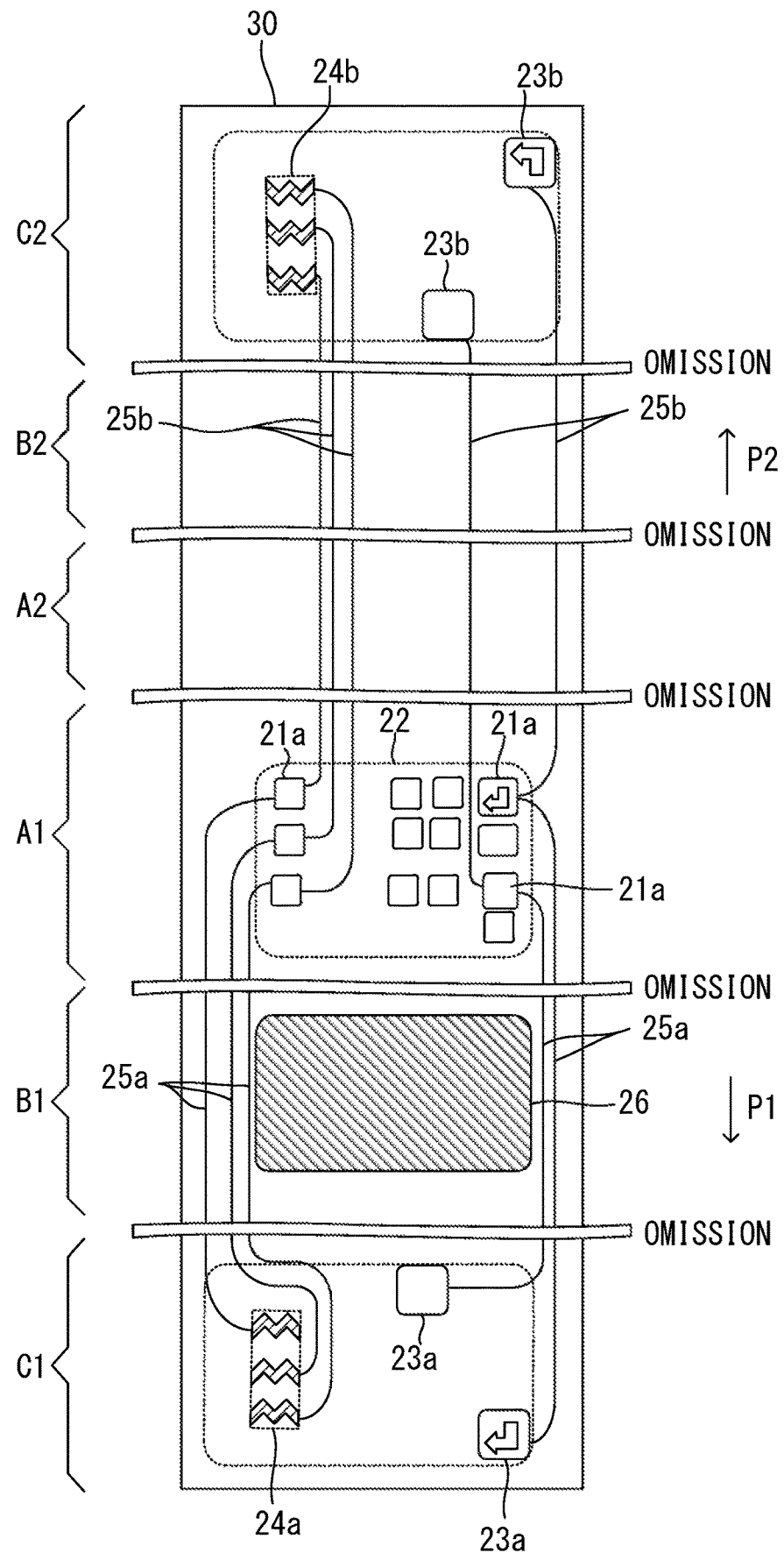
FIG. 5 is a configuration diagram of a modification of the film.

FIG. 4 is a configuration diagram of a modification of the input device. FIG. 5 is a configuration diagram of a modification of the film. The same components as those shown in FIGS. 1 and 2 are denoted by the same reference numerals as those used in FIGS. 1 and 2, and explanation of them is not repeated herein. In FIG. 4, the surface of the bottom portion 11 on the side of the operator 3 is set as a region C1, the surface of the middle portion 12 on the side of the operator 3 is set as a region B1, and the upper surface of the ceiling portion 13 is set as a region A1. Further, the surface of the bottom portion 1 on the side of an operator 4 is set as a region C2, the surface of the middle portion on the side of the operator 4 is set as a region B2, and the lower surface of the ceiling portion 13 is set as a region A2.

The support stand 10 in FIG. 4 is the same as the support stand 10 in FIG. 1, but a film 30 in FIG. 4 has a different structure from the film 20 in FIG. 1. Specifically, while the film 20 is bonded onto the region A1, the region B1, and the region C1 of the support stand 10, the film 30 is bonded not only onto the region A1, the region B1, and the region C1 of the support stand 10, but also onto the region A2, the region B2, and the region C2 of the support stand 10.

In FIG. 5, the portions of the film 30 corresponding to the regions A1 through C1 and the regions A2 through C2 are formed with a single continuous film. The portions of the film 30 corresponding to the regions A1 through C1 are the same as the corresponding portions of the film 20.

The portion of the film 30 corresponding to the region C2 includes transparent electrodes 23*b* and a slider electrode 24*b* that serve as the third electrode. The number of transparent electrodes 23*b* and the number of slider electrodes 24*b* are not necessarily the same as those in the example shown in FIG. 5. The transparent electrodes 23*b* are disposed in a direction P2 that is the opposite of a direction P1 from the transparent electrodes 21*a* toward the transparent electrodes 23*a*, and are connected to the transparent electrodes 21*a* in the region A1 via wiring lines 25*b*. The slider electrode 24*b* is an electrode for inputting continuous operations conducted by the operator 4 with a finger. The slider electrode 24*b* is disposed in the direction P2, which is the opposite of the direction P1 from the transparent electrodes 21*a* toward the slider electrode 24*a*, and is connected to the transparent electrodes 21*a* in the region A1 via wiring lines 25*b*. Note that the transparent electrodes 23*b*, the slider electrode 24*b*, and the wiring lines 25*b* are formed with the same materials as those of the transparent electrodes 23*a*, the slider electrode 24*a*, and the wiring lines 25*a*, respectively.

Figure 6A:
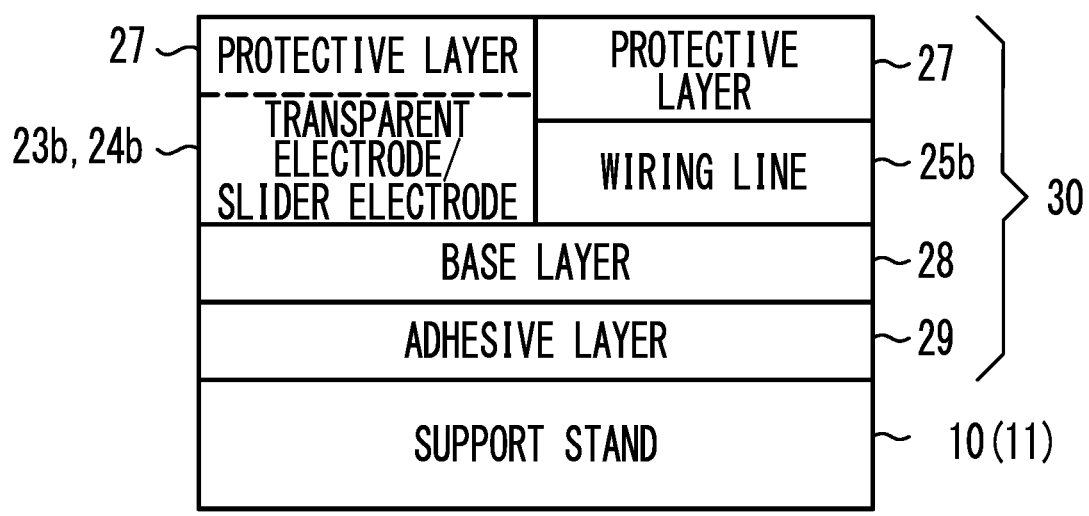
FIG. 6A is a cross-sectional view of a region C2.

FIG. 6A is a cross-sectional view of the portion of the film 30 corresponding to the region C2. In the region C2, the film 30 includes the transparent electrodes 23*b*, the slider electrode 24*b*, the wiring lines 25*b*, the protective layer 27, the base layer 28, and the adhesive layer 29. The adhesive layer 29, the base layer 28, the transparent electrodes 23*b*/the slider electrode 24*b* or the wiring lines 25*b*, and the protective layer 27 are stacked in this order on the support stand 10. The protective layer 27 may be provided on the transparent electrodes 23*b* and the slider electrode 24*b*, but is not necessarily provided thereon.

Figure 6B:
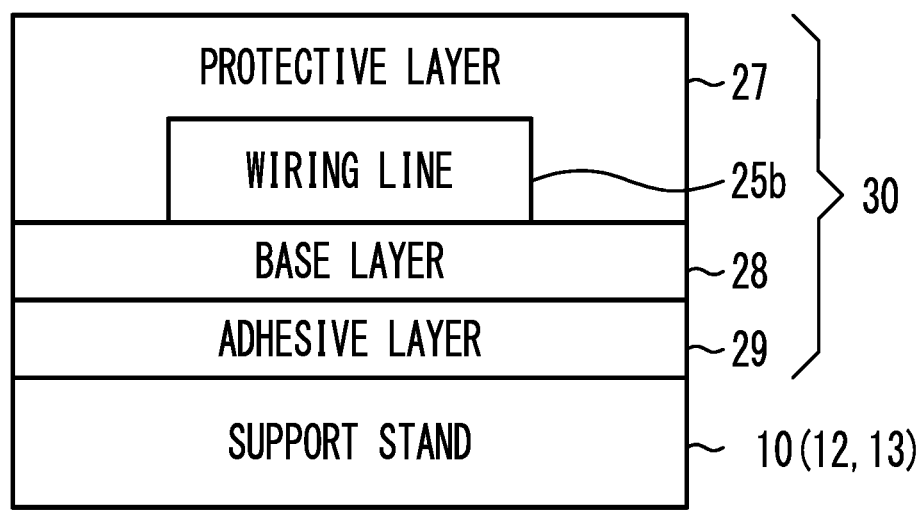
FIG. 6B is a cross-sectional view of regions A2 and B2.

As shown in FIG. 5, the portions of the film 30 corresponding to the regions A2 and B2 include the wiring lines 25*b*. More specifically, as shown in the cross-sectional view in FIG. 6B, the portions of the film 30 corresponding to the regions A2 and B2 include the wiring lines 25*b*, the protective layer 27, the base layer 28, and the adhesive layer 29.

Unlike the portion of the film 30 corresponding to the region B1 located on the opposite side from the region B2, the portion of the film 30 corresponding to the region B2 does not include the light diffraction layer 26. This is because it is enough for the light diffraction layer 26 to be included in the portion of the film 30 corresponding to one of the regions B1 and B2. Specifically, the liquid crystal display light from the ceiling portion 13 in FIG. 4 is semi-reflected (refracted) by the light diffraction layer 26, and is guided toward the operator 3 (or in a direction R1 perpendicular to the light incident direction) while being also guided toward the operator 4 (or in a direction R2 that is perpendicular to the light incident direction and is the opposite of the direction R1). Accordingly, the operators 3 and 4 can simultaneously check the image displayed on the liquid crystal display as a floating image.

As shown in FIG. 5, the transparent electrodes 23*a* and the transparent electrodes 23*b* are connected to the same transparent electrodes 21*a* in the region A1, and the slider electrode 24*a* and the slider electrode 24*b* are connected to the same transparent electrodes 21*a* in the region A1, so that two operational regions (the regions C1 and C2) for operating the same function can be created.

The transparent electrodes 23*a* and the transparent electrodes 23*b* may be connected to different transparent electrodes 21*a* from each other, and the slider electrode 24*a* and the slider electrode 24*b* may be connected to different transparent electrodes 21*a* from each other, unlike those shown in FIG. 5. In this case, two operational regions (the regions C1 and C2) for operating different functions from each other can be created.

In this embodiment, the information processing terminal 2 is a smartphone or a tablet terminal, for example. However, the information processing terminal 2 may be of any type, if it is equipped with a display including a capacitive touch panel or a display to which a capacitive touch panel is externally attached. For example, the information processing terminal 2 may be a car navigation system, an amusement machine, a gaming machine, a medical device, a POS terminal, a household electric device, or the like.

As described so far, according to this embodiment, the film 20 or 30 includes the transparent electrodes 21*a* facing desired positions in the screen of a liquid crystal display that includes a capacitive touch panel therein or has a capacitive touch panel externally attached thereto, the transparent electrodes 23*a* or the slider electrode 24*a* electrically connected to the transparent electrodes 21*a*, and the light diffraction layer 26 that refracts light from the screen of the liquid crystal display in a desired direction.

Thus, an operator can operate only the function displayed on the liquid crystal display at the position facing the corresponding transparent electrode 21*a* by operating the transparent electrodes 23*a* and the slider electrode 24*a* while checking the image displayed as a floating image on the liquid crystal display. In this manner, unnecessary operational regions that might trigger incorrect operations can be reduced.

Furthermore, the film 20 or 30 does not require any control chip or wireless battery or the like. Also, there are no restrictions on the positions of the transparent electrodes 23*a* to be electrically connected to the transparent electrodes 21*a*, and accordingly, only the necessary functions among the functions of the screen of the information processing terminal 2 can be rearranged. Further the operator does not directly touch the liquid crystal display of the information processing terminal 2, and thus, tolerability to incorrect operations due to water droplets can be enhanced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A film separated from a display device when the display device is not placed on the film, and facing the display device when the display device is placed on the film, the display device having a capacitive touch panel, the film comprising:

a first electrode facing the capacitive touch panel of the display device when the display device is placed on the film;

a second electrode electrically connected to the first electrode; and an optical layer that refracts light from a screen of the display device in a first direction perpendicular to an incident direction of the light.

2. The film according to claim 1, further comprising a third electrode that is disposed in a second direction and is electrically connected to the first electrode, the second direction being the opposite of a third direction from the first electrode toward the second electrode, wherein the optical layer refracts light from the screen of the display device in the first direction, and refracts the light in a fourth direction that is perpendicular to the incident direction of the light and is the opposite of the first direction.

3. An input device comprising:

a support that includes:

a bottom portion;

a middle portion that stands obliquely upward from the bottom portion, one end of the middle portion being secured to the bottom portion; and a ceiling portion that extends in a horizontal direction from the other end of the middle portion, and is substantially parallel to the bottom portion, a display device being mountable on the ceiling portion, a capacitive touch panel being included in or externally attached to the display device;

a first electrode that is attached to the ceiling portion, and faces a desired position in a screen of the display device;

a second electrode that is attached to the bottom portion, and is electrically connected to the first electrode; and an optical layer that is attached to the middle portion, and refracts light from the screen of the display device in a desired direction.

4. The input device according to claim 3, further comprising a third electrode that is attached to the bottom portion, is disposed in a second direction, and is electrically connected to the first electrode, the second direction being the opposite of a first direction from the first electrode toward the second electrode, wherein the optical layer refracts light from the screen of the display device in a third direction perpendicular to an incident direction, and refracts the light in a fourth direction that is perpendicular to the incident direction and is the opposite of the third direction.

5. The film according to claim 1, wherein the optical layer is arranged between the first electrode and the second electrode.

* * * * *